(12) United States Patent
Sun et al.

(10) Patent No.: US 12,254,420 B1
(45) Date of Patent: Mar. 18, 2025

(54) POINT-OF-INTEREST RECOMMENDATION METHOD BASED ON TEMPORAL KNOWLEDGE GRAPH

(71) Applicants: Hangzhou Dianzi University Binjiang Institute Co., Ltd., Zhejiang (CN); Hangzhou Dianzi University, Zhejiang (CN)

(72) Inventors: Xiao Xiao Sun, Zhejiang (CN); Dong Jin Yu, Zhejiang (CN); Bo Yi Huang, Zhejiang (CN); Si Xuan Wang, Zhejiang (CN); Dong Jing Wang, Zhejiang (CN); Yao Wang Chen, Zhejiang (CN)

(73) Assignees: Hangzhou Dianzi University Binjiang Institute Co., Ltd., Zhejiang (CN); Hangzhou Dianzi University, Zhejiang (CN)

( * ) Notice: Subject to any disclaimer, the term of this patent is extended or adjusted under 35 U.S.C. 154(b) by 0 days.

(21) Appl. No.: 18/945,454

(22) Filed: Nov. 12, 2024

(30) Foreign Application Priority Data

Jun. 24, 2024 (CN) .......................... 202410813896.9

(51) Int. Cl.
*G06N 5/022* (2023.01)
(52) U.S. Cl.
CPC .................................. *G06N 5/022* (2013.01)

(58) Field of Classification Search
CPC ....................................................... G06N 5/022
See application file for complete search history.

(56) References Cited

U.S. PATENT DOCUMENTS

2023/0306058 A1\* 9/2023 Matsubara ............. G06Q 10/04

\* cited by examiner

*Primary Examiner* — Etienne P Leroux
(74) *Attorney, Agent, or Firm* — JCIPRNET

(57) ABSTRACT

The disclosure discloses a point-of-interest recommendation method based on a temporal knowledge graph. Based on the historical behavior trajectory of the user and multimodal information, the disclosure constructs a dynamic temporal knowledge graph and a static group knowledge graph, which are used to learn interest preferences of the user that change over time and stable features that do not change over time, respectively. At the same time, the disclosure uses deep learning methods to build a point-of-interest recommendation model, which can extract a point-of-interest fusion feature representation and a user fusion feature representation from the two knowledge graphs in combination with a user review sentiment embedding sequence to accurately predict a point of interest most likely to be visited by the target user at a next moment. The disclosure has the characteristics of high precision and strong scalability, and can provide support for personalized user behavior trajectory prediction.

9 Claims, 5 Drawing Sheets

POINT-OF-INTEREST RECOMMENDATION METHOD BASED ON TEMPORAL KNOWLEDGE GRAPH

CROSS-REFERENCE TO RELATED APPLICATION

This application claims the priority benefit of China application serial no. 202410813896.9, filed on Jun. 24, 2024. The entirety of the above-mentioned patent application is hereby incorporated by reference herein and made a part of this specification.

BACKGROUND

Technical Field

The disclosure relates to the field of personalized recommendation technology, and in particular to a point-of-interest recommendation method based on a temporal knowledge graph.

Description of Related Art

With the breakthrough development of mobile Internet, users around the world are increasingly connected. People can share their daily activities and pass on the joy of life on location-based social platforms. The large amount of user interaction information has also led to the emergence of geo-tagged datasets such as Foursquare, Gowalla, and Yelp, providing new vitality and impetus for point-of-interest (POI) recommendations. POI recommendation can use the historical check-in information of the user to predict a place likely to be visited next by the user, and can also use multimodal information such as time, geographic location, POI category, and social relationships to achieve better prediction capabilities and provide convenience for daily travel for the user.

In the existing technology, many graph neural network-based methods have achieved good results by learning global users and POI features. However, most existing methods only specifically utilize one of the factors such as trajectory information, geographic location, social network, and user reviews, and do not fully utilize the advantages of multimodal information in real scenarios. In addition, the behavior pattern information contained in the historical trajectory of the user has not been effectively divided, which is not conducive to the learning of personalized preferences of the user.

Therefore, how to construct an effective model to establish multimodal information relationships and fully fuse the information is a technical problem that needs to be solved urgently.

SUMMARY

In order to overcome the above-mentioned disadvantages of the related art, the disclosure provides a point-of-interest recommendation method based on a temporal knowledge graph, which can effectively solve the above-mentioned problems.

The technical solutions specifically adopted in the disclosure are as follows:

In the first aspect, the disclosure provides a point-of-interest recommendation method based on a temporal knowledge graph, which includes:

S1. Based on complete historical behavior trajectories of all users, the dynamic temporal knowledge graph and the static group knowledge graph are constructed; the dynamic temporal knowledge graph is a graph set formed by dynamic relationship knowledge graphs of different historical time slices, each dynamic relationship knowledge graph records the dynamic relationship between all users and points of interest in the historical time slices, the dynamic relationship includes a visit relationship for recording a visit behavior of the user to the point of interest, and a follow-up relationship for recording a neighboring visit behavior of the user to different points of interest; the static group knowledge graph records the static relationships between all users and points of interest in all historical time slices, the static relationship includes a social relationship for recording a friend relationship between the users, a location relationship for recording a spatial area where the point of interest is located, a neighboring relationship for recording whether different points of interest are neighboring points, a category relationship for recording a point-of-interest category to which the point of interest belongs, and a group relationship for recording a user group grouped according to a visited point of interest and a visited spatial area.

S2. A historical behavior trajectory substring of a target user before a time to be predicted is obtained, and a user review text of each point of interest visited by the user is sequentially extracted therefrom, word embedding is performed on the user review text using an aspect-level sentiment analysis module built based on a pre-trained model, and the sentiment embeddings of all user review texts are concatenated to obtain a user review sentiment embedding sequence.

S3. The historical behavior trajectory substring, the dynamic temporal knowledge graph, the static group knowledge graph, and the user review sentiment embedding sequence are input into the point-of-interest recommendation model. An embedding module first performs word embedding on the input data, then a multimodal knowledge fusion module fuses the dynamic temporal knowledge graph and the static group knowledge graph based on the heterogeneous mutual attention mechanism and fuses the point of interest, the user, and other multimodal information to obtain the point-of-interest fusion feature representation and the user fusion feature representation, finally, a decoding module concatenates the point-of-interest fusion feature representation and the user fusion feature representation and then inputs into the cascaded recurrent neural network and the multi-layer perceptron to predict a point of interest likely to be visited by the target user at a next moment.

As a preferred embodiment of the first aspect, in the dynamic temporal knowledge graph, the visit relationship is recorded by a four-tuple formed by the user, a visit relationship identifier, a visit point of interest, and a visit time, and the follow-up relationship is recorded by a four-tuple formed by a previously visited location, a follow-up identifier, a later visited location, and the visit time.

In the static group knowledge graph, the social relationship is recorded by a triple formed by a user, a social relationship identifier, and a user, the location relationship is recorded by a triple formed by the point of interest, a location relationship identifier, and a Geohash-5 spatial area located, the neighboring relationship is recorded by a triple formed by the point of interest, a neighboring relationship identifier, and a point of interest, the category relationship is recorded by a triple formed by the point of interest, a category relationship identifier, and a point-of-interest category, the group relationship is recorded by a triple formed by the user, a group relationship identifier, and the user group, in which the user group is divided into a point-of-interest level group based on the clustering of visited points of interest and an area level group based on the clustering of visited Geohash-5 spatial areas.

As a preferred embodiment of the first aspect, the aspect-level sentiment analysis module is obtained by fine-tuning a pre-trained DistilBERT model cascaded with a multi-class classifier; in the aspect-level sentiment analysis module, an embedding representation is first generated for the user review text by the DistilBERT model, then, the embedding representation is input into the multi-class classifier to obtain a review dimension corresponding to the user review text and a positive or negative score on each of the review dimensions, and the positive or negative scores on all of the review dimensions are concatenated and output as the sentiment embedding corresponding to the user review text.

Furthermore, the review dimension includes three dimensions: product, price, and service.

As a preferred embodiment of the first aspect, the processing flow in the multimodal knowledge fusion module is as follows:

S31. The dynamic temporal knowledge graph and the static group knowledge graph are respectively input into the heterogeneous graph transformer network for information fusion, and the fused dynamic temporal knowledge graph and the static group knowledge graph are obtained.

S32. All points of interest in the historical behavior trajectory substring are arranged according to the order of user visits, the hidden layer vector corresponding to each point of interest is extracted sequentially from the fused dynamic temporal knowledge graph to form a user behavior trajectory embedding with global time slice information, the hidden layer vector corresponding to each point of interest is sequentially extracted from the fused static group knowledge graph to form a user behavior trajectory embedding with global static information; a point-of-interest level group feature and an area level group feature are extracted from the fused static group knowledge graph.

S33. The user review sentiment embedding sequence is used as a query, the user behavior trajectory embedding with global time slice information and the original user behavior trajectory embedding are fused through an attention mechanism to obtain a fused user behavior trajectory embedding; the fused user behavior trajectory embedding is used as the value, the user behavior trajectory embedding with global static information is used as the query, and the point-of-interest level group feature is used as the key. The above-mentioned input is input into the Encoder module of the Transformer model for fusion encoding to obtain the point-of-interest fusion feature representation.

S34. The point-of-interest level group feature and the area level group feature are concatenated and fused, the obtained fused group feature is used as a key, the user embedding feature representations of all users in the fused static group knowledge graph are used as a query, and the user embedding feature representations of all users in the original static group knowledge graph are used as the value. The above-mentioned input is input into the Encoder module of the Transformer model for fusion encoding to obtain the user fusion feature representation.

As a preferred embodiment of the first aspect, the point-of-interest recommendation model needs to be optimized in advance by a total loss function, and the total loss function is obtained by weighting the point-of-interest prediction loss and a static graph loss.

Furthermore, the point-of-interest recommendation model needs to be trained in advance, and the total loss function used in the training is obtained by weighting the point-of-interest prediction loss and the static graph loss of all historical time slices; the point-of-interest prediction loss is the cross entropy loss between the predicted value and the label value output by the point-of-interest recommendation model. The calculation formula for the static graph loss of any x-th historical time slice is $$\mathcal{L}_x^{st} = \sum_{i=1}^{|V|} \max(\cos(\min(\gamma x, 90°)) - \cos(H_i^{G^{st}}, H_i^{G_x}), 0),$$

in which the hyperparameter $\gamma$ represents the rate of increase of the deviation angle, and $|V|$ represents the number of entities in the entity set V formed by all users and all points of interest in the static group knowledge graph, $$H_i^{G^{st}}$$

and $$H_i^{G_x}$$

respectively represent the corresponding embedding feature representations of the i-th entity in the entity set V in the fused dynamic temporal knowledge graph and the fused static group knowledge graph.

Compared with the related art, the beneficial effects of the disclosure are as follows:

Aiming at the next point-of-interest recommendation problem in multimodal scenarios, the disclosure proposes a point-of-interest recommendation method based on a temporal knowledge graph. This method constructs a dynamic temporal knowledge graph and a static group knowledge graph based on the historical behavior trajectory of the user to learn the dynamic behavior preferences of the user and static features. In addition, the disclosure uses heterogeneous mutual attention mechanism to aggregate information of the dynamic temporal knowledge graph and the static group knowledge graph to learn multi-dimensional heterogeneous information in the knowledge graph. Also, through introducing the multimodal knowledge fusion module, with the assistance of high-quality semantic information reflecting sentiment tendency of the user extracted from user review texts by the aspect-level sentiment analysis module, user features and point-of-interest features are cross-learned to effectively address the information fusion problem in real scenarios and provide guidance for the next point-of-interest recommendation. The disclosure has the characteristics of high precision and strong scalability, and can timely grasp the user behavior trend and provide technical support for realizing personalized user behavior trajectory prediction.

DESCRIPTION OF THE EMBODIMENTS

In order to make the purpose, technical solutions, and advantages of the disclosure more comprehensible, the disclosure is further described in detail below with reference to the accompanying drawings.

Figure 1:
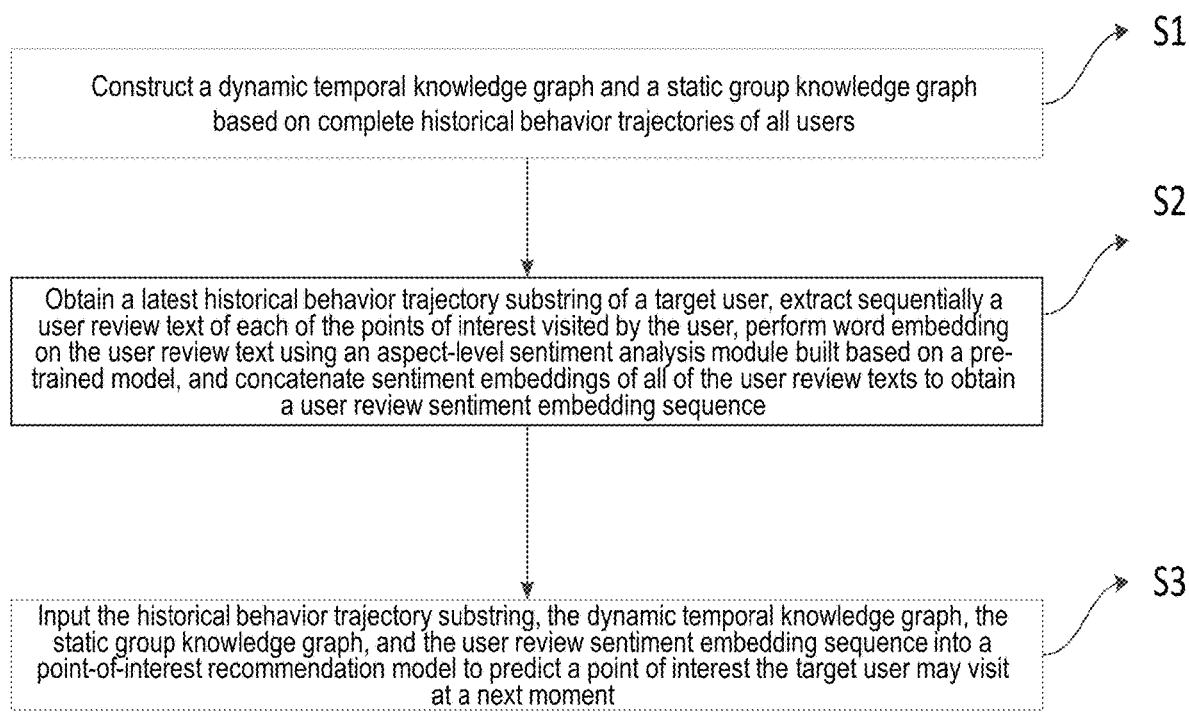
FIG. 1 is a schematic diagram of the steps of a point-of-interest recommendation method based on a temporal knowledge graph in an embodiment of the disclosure.
Figure 2:
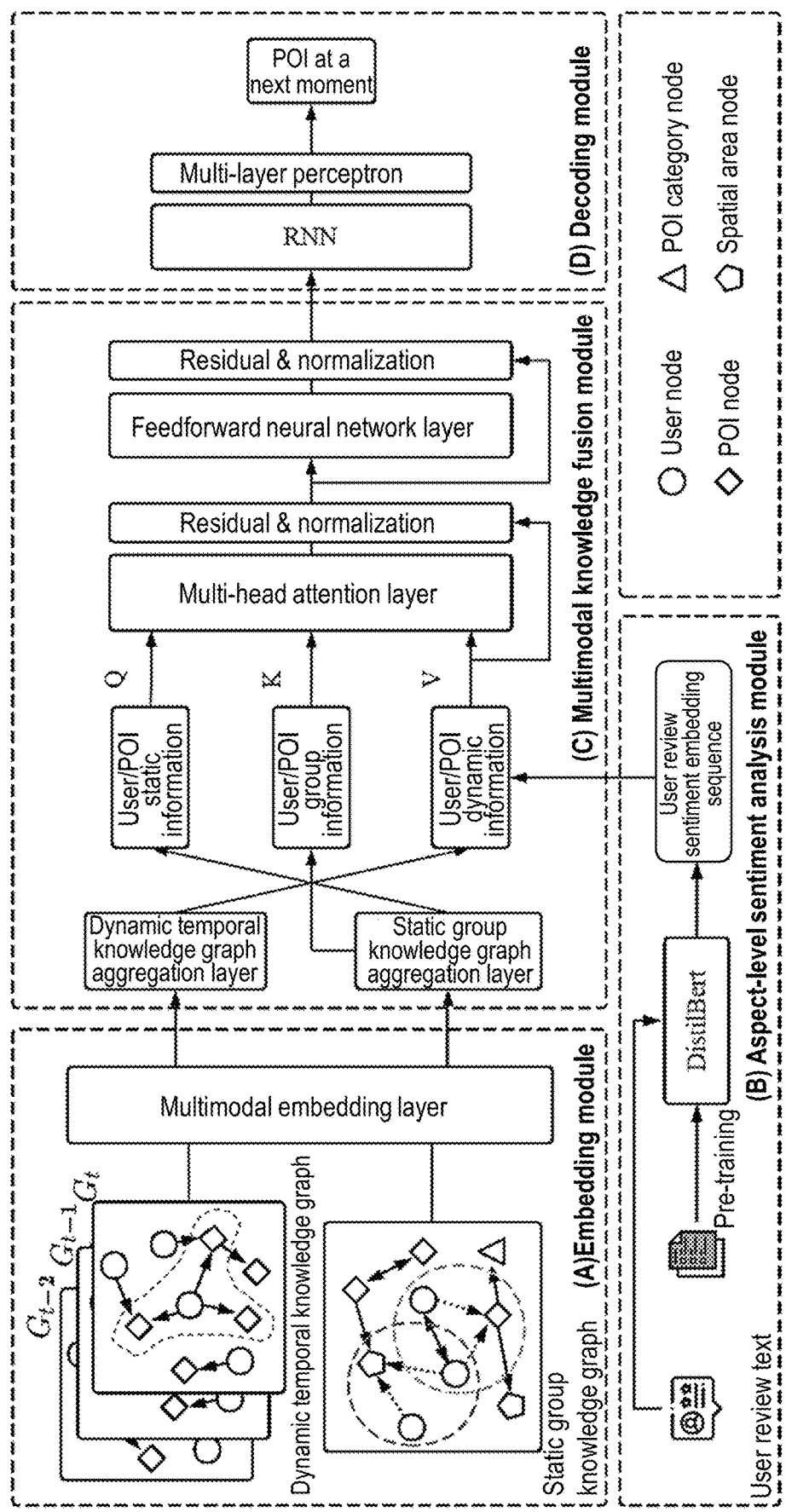
FIG. 2 is a schematic diagram of a network architecture of a Point-of-interest recommendation model according to an embodiment of the disclosure.

As shown in FIG. 1, in a preferred embodiment of the disclosure, a point-of-interest recommendation method based on a temporal knowledge graph is specifically implemented through the following steps S1 to S3. The point-of-interest recommendation method may be based on historical check-in data of the user and multimodal information, and the deep learning method is used to establish a deep learning model with a network framework as shown in FIG. 2 to extract user preference features, thereby places most likely to be visited by the current user is accurately predicted. The disclosure may use a dynamic temporal knowledge graph and a static group knowledge graph to learn the trajectory sequence and the multimodal relationship respectively and fuse the graphs organically; at the same time, behavior pattern information included in the historical trajectory of the user is effectively divided through the dynamic temporal knowledge graph, and the intrinsic pattern and the evolution relationship of each time slice are learned in a targeted manner to achieve the prediction of the next point of interest that meets the personalized preferences of the user.

The specific implementation methods of Steps S1 to S3 are respectively described in detail below.

S1. Based on complete historical behavior trajectories of all users, the dynamic temporal knowledge graph and the static group knowledge graph are constructed; the dynamic temporal knowledge graph is a graph set formed by dynamic relationship knowledge graphs of different historical time slices, each dynamic relationship knowledge graph records the dynamic relationship between all users and points of interest in the historical time slices, the dynamic relationship includes a visit relationship for recording a visit behavior of the user to the point of interest, and a follow-up relationship for recording a neighboring visit behavior of the user to different points of interest; the static group knowledge graph records the static relationships between all users and points of interest in all historical time slices, the static relationship includes a social relationship for recording a friend relationship between the users, a location relationship for recording a spatial area where the point of interest is located, a neighboring relationship for recording whether different points of interest are neighboring points, a category relationship for recording a point-of-interest category to which the point of interest belongs, and a group relationship for recording a user group grouped according to a visited point of interest and a visited spatial area.

It should be noted that the construction of the two graphs requires the complete historical behavior trajectories of all users, the complete historical behavior trajectory of each user may be obtained from social platforms that record the visit behavior to the point of interest (POI) of the user, such as Foursquare, Gowalla, and Yelp. Moreover, the construction of the two graphs requires the trajectories of all users on the social platform, and a time span of a complete historical behavior trajectory is a specified historical period. The specific length of the historical period may be reasonably selected based on the actual data situation, such as the most recent 6 months or the most recent 1 year.

In addition, the specific construction method of the knowledge graph belongs to the existing technology, and the relationship between entities may be recorded by designing reasonable tuples.

It should be noted that Step S1 may be performed by the mobile device on the user side together with the computer device on the server side, and the specific execution process is as follows. First, each user of the social platform has a mobile device pre-installed with a social platform application (APP) that is required to recommend points of interest, and such APPs include but are not limited to Foursquare, Gowalla, and Yelp. When the user opens the application and sends a check-in request through the GUI interface, the application needs to call the GPS module on the mobile device to record the current latitude and longitude coordinates of the mobile device, and the longitude and latitude coordinates are encapsulated into the positioning information format specified by the server and uploaded to the server side of the social platform through wireless networks such as 4G, 5G, and Wifi. The server side of the social platform associates the check-in points of interest of the user, check-in time, and the positioned longitude and latitude coordinate information and stores the information in the historical behavior trajectory data of the user. Thus, the server side of the social platform may continuously record the check-in information uploaded by the user, thereby forming a complete historical behavior trajectory of each user for execution by a computer device of the point-of-interest recommendation method of the disclosure.

When the server side receives a request for recommending points of interest, the computer device responsible for executing the task of recommending points of interest communicates through the network communication, uses the data interface provided by the social platform, and reads the complete historical behavior trajectory of all users required to build the two graphs from the database of the social platform, and the read data is stored in the local storage of the computer device. Afterward, the computer device reads the data stored in the local storage into the memory, constructs the dynamic temporal knowledge graph and the static group knowledge graph, and stores the constructed knowledge graph data back into the local storage of the computer device for executing subsequent Step S2 and Step S3.

It should be noted that the computer device on the server side responsible for executing the point-of-interest recommendation task may be an independent computer device. However, if the computer device performing other tasks on the social platform server has redundant computing and storage resources, other computer devices may also be reused, and the disclosure is not limited thereto.

In an embodiment of the disclosure, for the two dynamic relationships existing in the dynamic temporal knowledge graph, the visit relationship may be recorded by a four-tuple formed by the user, a visit relationship identifier, a visit point of interest, and a visit time, and the follow-up relationship may be recorded by a four-tuple formed by a previously visited location, a follow-up identifier, a later visited location, and the visit time.

Figure 3:
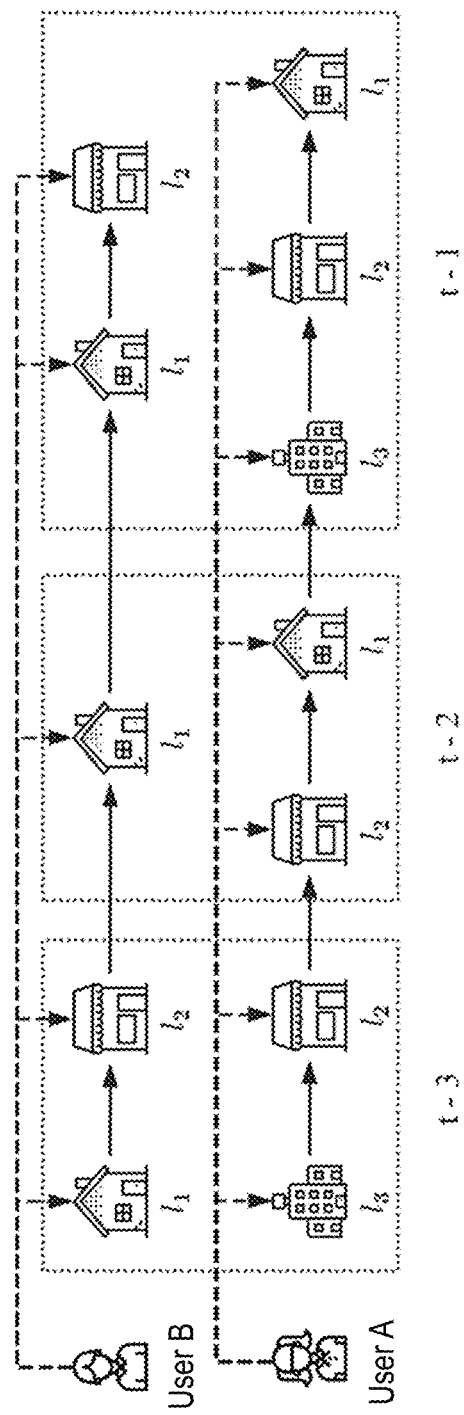
FIG. 3 is a schematic diagram of constructing a dynamic temporal knowledge graph in an embodiment of the disclosure.
Figure 4:
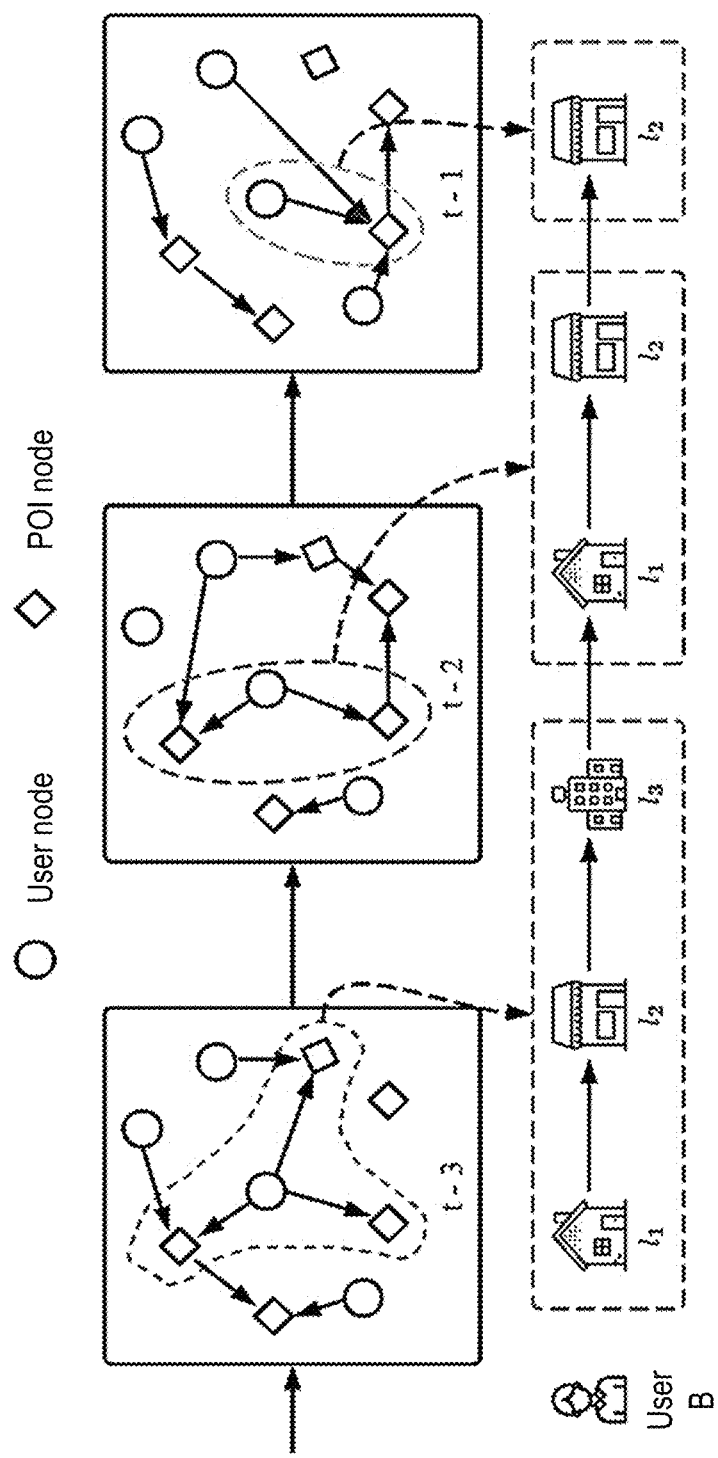
FIG. 4 is a schematic diagram of a dynamic temporal knowledge graph taking user B as an example and extracting user behavior trajectory embedding therefrom in an embodiment of the disclosure.

Specifically, when constructing the dynamic temporal knowledge graph, the time span of the complete historical behavior trajectory of each user may be divided into a series of historical time slices according to a fixed interval T, and all trajectory segments of each historical time slice may be constructed into the dynamic relationship knowledge graph. As shown in FIG. 3, in an example, the respective complete historical behavior trajectories of a user B and a user A may be divided into three historical time slices: t-3, t-2, and t-1, and then the dynamic relationship knowledge graph may be constructed for each time slice. As shown in FIG. 4, taking the user B as an example, the user visits $l_1$, $l_2$, and $l_3$ in the historical time slice t-3, the information is recorded in the corresponding dynamic relationship knowledge graph, and the same is true for the other two historical time slices t-2 and t-1. However, it should be noted that the dynamic relationship knowledge graph of each historical time slice includes all users and points of interest (POI), and records the dynamic relationships therebetween, not just for a single user. Therefore, in an embodiment of the disclosure, the dynamic temporal knowledge graph may be expressed as $G=\{G_1, G_2, \ldots, G_t, \ldots\}$, in which each dynamic relationship knowledge graph $G_t=(V, R, \varepsilon_t)$ includes user nodes, POI nodes, and the two dynamic relationships involved therebetween, in which V is a node set formed by two entities, which are the user node and the POI node, R is a relationship set that records the two dynamic relationships, $\varepsilon_t$ is a four-tuple set that records the dynamic relationships between nodes in the current historical time slice, in which: the visit relationship marked with $r_v$ shows the interaction between the user and the POI, which is formed by the four-tuple $(u, r_v, l, t)$, which means that the user u visited the location l at the time t; the follow-up relationship marked with $r_f$ shows the neighboring visit behavior between two POIs, which is formed by the four-tuple $(l_1, r_f, l_2, t)$, which means that the user first visited the location $l_1$ and then visited the location $l_2$ at the time t. The fixed interval T may be optimized and adjusted according to actual conditions. In an embodiment of the disclosure, T is set to 1 month, so each dynamic relationship knowledge graph includes visit behavior data of all users to POIs within one month.

In an embodiment of the disclosure, the construction of the static group knowledge graph does not require considering the different historical time slices like the construction of the dynamic temporal knowledge graph, it is only necessary to construct all data in the complete time span into one graph. For the five static relationships existed in the static group knowledge graph, the social relationship may be recorded by a triple formed by a user, a social relationship identifier, and a user, the location relationship may be recorded by a triple formed by the point of interest, a location relationship identifier, and a Geohash-5 spatial area located, the neighboring relationship may be recorded by a triple formed by the point of interest, a neighboring relationship identifier, and a point of interest, the category relationship may be recorded by a triple formed by the point of interest, a category relationship identifier, and a point-of-interest category, the group relationship may be recorded by a triple formed by the user, a group relationship identifier, and the user group, in which the user group is divided into a point-of-interest level group based on the clustering of visited points of interest and an area level group based on the clustering of visited Geohash-5 spatial areas. The cluster here is essentially to group the users according to the points of interest and the Geohash-5 spatial areas visited by the users, that is, users who have visited the same point of interest are grouped at the point-of-interest level group for the point of interest, and users who have visited the same Geohash-5 spatial area are grouped at the area level group for the Geohash-5 spatial area.

Therefore, in an embodiment of the disclosure, the static group knowledge graph may be represented as $G^{st}=(V^{st}, R^{st}, \varepsilon^{st}, C^l, C^g)$, which includes all types of nodes and the five static relationships involved therebetween. Since the static group knowledge graph further introduces the two concepts of Geohash-5 spatial area and point-of-interest category, two additional types of nodes may be added to the graph to facilitate recording relationships through triples. In the formula, $V^{st}$ is a node set formed by five entities, which are the user node, the POI node, a category node, and a region node, $R^{st}$ is a relationship set that records the five static relationships, $C^l$, $C^g$ are respectively a point-of-interest category set and a Geohash-5 spatial area set, $\varepsilon^{st}$ is a set of triples that records the static relationships between the nodes, in which: the social relationship marked with $r_s$ shows the friendship relationship between users, which is formed by the triple $(u_1, r_s, u_2)$, which means that users $u_1$ and $u_2$ are friends; the location relationship marked with $r_l$ shows the location relationship between the POI and the Geohash-5 spatial area, which is formed by the triple $(l, r_l, g)$, which means that the POI node l is located in the area g; the neighboring relationship marked with $r_n$ shows the neighboring relationship between POI nodes, which is formed by the triple $(l_1, r_n, l_2)$, which means that the distance between POI nodes $l_1$ and $l_2$ is less than a given distance threshold; the category relationship marked with $r_c$ shows the category relationship of POI, which is formed by the triple $(l, r_c, c)$, which means that the POI node l belongs to the category c; the group relationship marked with $r_g$ shows the user group relationship based on POI and region, which is formed by the triple $(u, r_g, C)$, which means that the user u belongs to the group C. Since the groups are divided into the point-of-interest level group and the area level group, the group $C \in [C^l, C^g]$.

The Geohash-5 spatial area used in the disclosure may be obtained by encoding the entire geographic space through the Geohash algorithm, the algorithm is an address encoding method, which can encode two-dimensional spatial latitude and longitude data into a character string. The algorithm belongs to the existing technology and may be directly calculated using existing related functions or programs. The basic steps of the algorithm are: first, the longitude and latitude are converted into binary according to different precision requirements, then, the longitude and latitude are merged, with the longitude occupying even digits and the latitude occupying odd digits, and finally, the binary string is encoded according to Base32. The longer the code is, the smaller the range represented, and the more precise the location is. The specific value of the precision may be optimized and adjusted according to actual conditions. In an embodiment of the disclosure, the precision is 5, that is, the code length is 5.

The dynamic temporal knowledge graph is constructed based on user entities, point-of-interest entities, and the dynamic relationships therebetween, and may be used to learn the behavior patterns of the users in each time slice and the behavior preferences that change over time; the static group knowledge graph is constructed based on static relationships between entities and may be used to learn multi-dimensional heterogeneous information and stable feature dependencies that do not change over time. Both of the graphs may provide preference information for the user on future point of interest selection from different dimensions.

S2. A historical behavior trajectory substring of a target user before a time to be predicted is obtained, and a user review text of each point of interest visited by the user is sequentially extracted therefrom, word embedding is performed on the user review text using an aspect-level sentiment analysis module built based on a pre-trained model, and the sentiment embeddings of all user review texts are concatenated to obtain a user review sentiment embedding sequence.

It should be noted that the historical behavior trajectory substring of the target user before the time to be predicted refers to the behavior trajectory formed by a series of points of interest that the target user desiring point-of-interest recommendations has recently visited before the time to be predicted, the number of points of interest forming the historical behavior trajectory substring may be adjusted according to actual needs. In an embodiment, the most recent 20 points of interest may be used, that is, the length of the historical behavior trajectory substring is 20.

It should be noted that the aspect-level sentiment analysis module may theoretically be trained and fine-tuned based on any pre-trained language model. In an embodiment of the disclosure, considering the requirements for model scale and operation speed in actual operation scenarios, the aspect-level sentiment analysis module preferably adopts the DistilBERT model pre-trained on a large-scale corpus to build the aspect-level sentiment analysis module, and after the pre-trained DistilBERT model, a multi-class classifier needs to be cascaded. Then, the cascaded model are fine-tuned together on the sentiment analysis dataset to obtain the aspect-level sentiment analysis module. The processing flow in the aspect-level sentiment analysis module is as follows: first, an embedding representation is generated for the input user review text by the DistilBERT model, then, the embedding representation is input into the multi-class classifier to obtain the review dimension corresponding to the user review text and the positive or negative score on each review dimension (that is, a two-dimensional vector recording the positive scores and negative scores), and the positive or negative scores on all review dimensions are concatenated and output as the sentiment embedding corresponding to the user review text.

It should be noted that the sentiment analysis dataset used in the fine-tuning process may be obtained through manual annotation specifically for a task of the disclosure. The training samples in the sentiment analysis dataset include the user review text on the point of interest and the true value label of the user review text in the review dimension and the positive or negative score of the review. The DistilBERT model is cascaded with the multi-class classifier to perform supervised learning on the sentiment analysis dataset, and after convergence, fine-tuning is completed. The specific review dimension may be designed based on the actual situation of the user review text data collected. For example, in a general review website, the dimensions involved in the user review text on a point of interest cover three dimensions, which are the product, the price, and the service. Therefore, the three dimensions may be considered as the review dimensions output by the multi-class classifier.

It should be noted that the product mentioned in the review dimension refers to the service product provided by the merchant corresponding to the point of interest. For example, for a restaurant, the product thereof is food, and for an amusement park, the product thereof is a recreational attraction.

In an embodiment of the disclosure, the entire pre-training and fine-tuning process may be specifically implemented through the following steps:

S21. The DistilBERT pre-trained model is pre-trained on the large-scale corpus, namely the BookCorpus dataset and English Wikipedia data.

S22. The review dimension of the user review text z is divided into three indicators, namely, the product, the price, and the service A={Product,Price, Service}, and then the positive/negative score of each review dimension is calculated; the embedding representation $e^z \in \mathbb{R}^d$ of the user review text z is obtained using the DistilBERT pre-trained model, and then the classification score $p^{asp} \in \mathbb{R}^{|A|}$ thereof on each review dimension is calculated using the multi-class classifier; in addition to calculating the classification score of the review dimension, it is also necessary to calculate the positive/negative score $$p_{a_i}^{pol} \in \mathbb{R}^2$$

of the user review text on each review dimension, $a_i \in A$, i $\in \lfloor 1, |A| \rfloor$, where the symbol "| |" represents a modulo length operation. The positive/negative score $$p_{a_i}^{pol}$$

represents the sentiment tendency score of the user on the review dimension $a_i \in A$. The calculation formulas for the two scores are as follows:

$$p^{asp} = \tanh(e^z W_0 + b_0) W^{asp} + b^{asp}$$

$$p_{a_i}^{pol} = \tanh(e^z W_0 + b_0) W_{a_i}^{pol} + b_{a_i}^{pol}$$

In the formula, $a_i \in A$, $i \in \lfloor 1, |A| \rfloor$ represents the i-th review dimension, and $W_0 \in \mathbb{R}^{d \times d}$, $W^{asp} \in \mathbb{R}^{d \times |A|}$, $W_{a_i}^{pol} \in \mathbb{R}^{d \times 2}$, $b_0 \in \mathbb{R}^d$, $b^{asp} \in \mathbb{R}^{|A|}$, $b_{a_i}^{pol} \in \mathbb{R}^2$ are all learnable parameters.

S23. The positive/negative score of each review dimension is concatenated to obtain the sentiment embedding $\forall \in \mathbb{R}^{2|A|}$ corresponding to the user review text:

$$\forall = \|_{i \in \lfloor 1,|A| \rfloor} p_{a_i}^{pol}$$

In the formula, ∥ represents the concatenation operation.

S24. The true value labels of $p^{asp}$ and $p_{a_i}^{pol}$ are combined, and by using the cross entropy loss function, a review dimension classification loss $L^{asp}$ and a sentiment tendency loss $L^{pol}$ may be calculated respectively. The final total loss function is:

$$L^{absa} = L^{asp} + L^{pol}$$

Based on the calculated $L^{absa}$, the learnable parameters in the DistilBERT and the multi-class classifier may be reversely optimized, thereby iterative training is continuously performed. After the model training is completed, the trained DistilBERT may be used to embed the user review text of each point of interest visited by the user and generate the sentiment embedding A corresponding to each user review text, and the sentiment embeddings A are sequentially concatenated to obtain the user review sentiment embedding sequence.

It should be noted that Step S2 is also executed by the computer device on the server side, and the specific execution process is as follows. First, the computer device communicates through the network communication, uses the data interface provided by the social platforms including but not limited to Foursquare, Gowalla, and Yelp, reads the historical behavior trajectory substring of the target user before the time to be predicted from the database of the social platform, and the read data is stored in the local storage of the computer device. Afterward, the computer device reads the data stored in the local storage into the memory, forms a user review sentiment embedding sequence through data processing, and stores the obtained user review sentiment embedding sequence back into the local storage of the computer device for executing the subsequent Step S3.

S3: The historical behavior trajectory substring of the target user before the time to be predicted, the dynamic temporal knowledge graph, the static group knowledge graph, and the user review sentiment embedding sequence are input into a point-of-interest recommendation model. An embedding module first performs word embedding on the input data, then a multimodal knowledge fusion module fuses the dynamic temporal knowledge graph and the static group knowledge graph based on the heterogeneous mutual attention mechanism and fuses the point of interest, the user, and other multimodal information to obtain the point-of-interest fusion feature representation and the user fusion feature representation, finally, a decoding module concatenates the point-of-interest fusion feature representation and the user fusion feature representation and then inputs into the cascaded recurrent neural network and the multi-layer perceptron to predict a point of interest likely to be visited by the target user at a next moment.

It should be noted that the embedding operation in the embedding module belongs to the existing technology, and the specific word vector dimension may be adjusted according to the input requirements of the actual model. In an embodiment of the disclosure, the four entities of the user, the POI, the point-of-interest category, and the Geohash-5 spatial area in the input data may be subjected to the embedding operation to obtain four feature vector representations of a dimension d, which correspond to four word vectors: user word vector $e_u \in \mathbb{R}^d$, POI word vector $e_i \in \mathbb{R}^d$, category word vector $e_c \in \mathbb{R}^d$, and region word vector $e_g \in \mathbb{R}^d$ and d is preferably 64.

In an embodiment of the disclosure, the multimodal knowledge fusion module may perform fusion operations on the dynamic temporal knowledge graph and the static group knowledge graph respectively, the POI, the user, and other multimodal information are fused to obtain richer context information. The processing flow in the multimodal knowledge fusion module is as follows:

S31. The dynamic temporal knowledge graph and the static group knowledge graph are input into the heterogeneous graph transformer network respectively, and information fusion of heterogeneous nodes is respectively performed based on the heterogeneous mutual attention mechanism within the network to obtain the fused dynamic temporal knowledge graph and static group knowledge graph.

The heterogeneous graph transformer network belongs to the existing technology, so details will not be repeated here. The heterogeneous graph transformer fusion of the two types of knowledge graphs is performed separately. For the dynamic temporal knowledge graph, $G=\{G_1, G_2, \ldots, G_t, \ldots\}$ may be input into the HGT network, and the fusion operation may be performed on each historical time slice to obtain the fused dynamic temporal knowledge graph, in which the hidden layer vector is represented as $H^G=\{H^{G_1}, H^{G_2}, \ldots, H^{G_t}, \ldots\}$. Similarly, for the static group knowledge graph, $G^{st}$ may be input into the HGT network for fusion operation to obtain the fused static group knowledge graph, in which the hidden layer vector is represented as $H^{G^{st}}$.

S32. All points of interest in the historical behavior trajectory substring are arranged according to the order of user visits, the hidden layer vector corresponding to each point of interest is sequentially extracted from the fused dynamic temporal knowledge graph to form a user behavior trajectory embedding with global time slice information, the hidden layer vector corresponding to each point of interest is sequentially extracted from the fused static group knowledge graph to form a user behavior trajectory embedding with global static information; a point-of-interest level group feature and an area level group feature are extracted from the fused static group knowledge graph.

It should be noted that the two user behavior trajectory embeddings are respectively extracted from the hidden layer vector representation $H^G$ of the fused dynamic temporal knowledge graph and the hidden layer vector representation $H^{G^{st}}$ of the static group knowledge graph, $H^G$ and $H^{G^{st}}$ record the hidden layer vector of each node in the graph (also referred to as embedding feature representation). When constructing the two user behavior trajectory embeddings, it is only necessary to extract the hidden layer vector of each point of interest according to the order of user visits, then the vectors are combined sequentially to form the user behavior trajectory embedding. Continuing with FIG. 4, for the user B, assuming that he visited some POIs in the three historical time slices t-3, t-2, and t-1, since the hidden layer vector representation $H^G$ of the dynamic temporal knowledge graph is still segmented according to the historical time slices, for each visited POI, the hidden layer vector representation of the historical time slice corresponding to the visit time may be found from $H^G$, the hidden layer vector of the POI node is extracted, and the vectors are concatenated according to the visit order of the POI to form the user behavior trajectory embedding. The embedding of the user behavior trajectory in the static group knowledge graph is also extracted in a similar way. However, there is no division of historical time slices in the static group knowledge graph, and thus there is no need to consider the visit time of the user, and the hidden layer vector of POI may be directly extracted from the graph sequentially. In addition, since there are two types of group information for each point of interest in the static group knowledge graph, the point-of-interest level group feature $e^l$ and the area level group feature $e^g$ of each point of interest may also be extracted from the fused static group knowledge graph according to the order of user visits, the $e^l$ of all visited points of interest form the total point-of-interest level group feature $E^l$, and the $e^g$ of all visited points of interest form the total point-of-interest level group feature $E^g$. In the operation, each point of interest records a user group that has visited the point of interest through a triplet. The average value of the user word vectors of all users in the group forms the point-of-interest level group feature $e^l$ of this POI. Similarly, each point of interest records the point-of-interest category relevantly belongs and a user group that has visited the point-of-interest category through a triplet. The average value of the user word vectors of all users in the group forms the area level group feature $e^g$ of this POI.

S33. The user review sentiment embedding sequence is used as a query, the user behavior trajectory embedding with global time slice information and the original user behavior trajectory embedding are fused through the attention mechanism to obtain a fused user behavior trajectory embedding; the fused user behavior trajectory embedding is used as the value, the user behavior trajectory embedding with the global static information is used as the query, and the point-of-interest level group feature is used as the key. The above-mentioned input is input into the Encoder module of the Transformer model for fusion encoding to obtain the point-of-interest fusion feature representation.

It should be noted that the query, key, and value in the disclosure are respectively Q (Query), K (Key), and V (Value) in the attention mechanism.

The original user behavior trajectory embedding refers to the user behavior trajectory embedding formed by extracting the hidden layer vector corresponding to each point of interest in the historical behavior trajectory substring in the order of visit from the dynamic temporal knowledge graph that has not been fused by the HGT network. For a historical behavior trajectory substring S(u), the user behavior trajectory embedding with the global time slice information may be denoted as $E_{S(u)}^G$, and the original user behavior trajectory embedding may be denoted as $E_{S(u)}$. The fusion process of the attention mechanism of the two trajectories may be expressed by the formula:

$$w_1 = \frac{1}{|S(u)|} \sum_{j \in S(u)} \Lambda^T \tanh\left(e_{l_j}^G W_1 + b_1\right)$$

$$w_2 = \frac{1}{|S(u)|} \sum_{j \in S(u)} \Lambda^T \tanh\left(e_{l_j} W_2 + b_2\right)$$

$$\beta_i = \frac{\exp(w_i)}{\sum_{j=i}^{2} \exp(w_j)}, i = 1, 2$$

$$\hat{E}_{S(u)}^f = \beta_1 E_{S(u)}^G + \beta_2 E_{S(u)}$$

In the formula, $$e_{l_j}^G \in E_{S(u)}^G$$

and $$e_{l_j} \in E_{S(u)}$$

represent the hidden layer vector of the j-th point of interest in $E_{S(u)}^G$ and respectively, $\forall$ is the user review sentiment embedding vector, $W_1, W_2 \in \mathbb{R}^{d \times d}$, $b_1, b_2 \in \mathbb{R}^d$, are all learnable parameters, and $$\hat{E}_{S(u)}^f$$

is the fused user behavior trajectory embedding.

Similarly, the user behavior trajectory embedding with the global static information is denoted as $$E_{S(u)}^{G^{st}},$$

and the process of fusion encoding through the Encoder module may be expressed by the formula:

$$x_{attn} = LayerNorm\left(\hat{E}_{S(u)}^f + \text{Attention}\left(E_{S(u)}^{G^{st}}, E^i, \hat{E}_{S(u)}^f\right)\right)$$

$$E_{S(u)}^f = FFN(x_{attn}) + x_{attn}$$

In the formula: LayerNorm represents the layer normalization operation; Attention represents the multi-head attention mechanism, in which $$E_{S(u)}^{G^{st}}, E^i, \hat{E}_{S(u)}^f$$

are used as Q, K, and V, which respectively represent user/POI static information, user/POI group information, and user/POI dynamic information; FFN represents a feed-forward neural network; $E_{S(u)}^f$ is the point-of-interest fusion feature representation finally obtained.

S34. The point-of-interest level group feature and the area level group feature are concatenated and fused, the obtained fused group feature is used as the key, the user embedding feature representations of all users in the fused static group knowledge graph is used as the query, and the user embedding feature representation of all users in the original static group knowledge graph is used as the value. The above-mentioned input is input into the Encoder module of the Transformer model for fusion encoding to obtain the user fusion feature representation.

It should be noted that the user embedding feature representation as the value refers to the user embedding feature representation of all users u extracted from the static group knowledge graph that has not been fused by the HGT network, denoted as $E_u$. If the user embedding feature representation of all users U in the fused static group knowledge graph is denoted as $$E_{\mathcal{U}}^{G^{st}},$$

then the process of generating user fusion feature representation by the above fusion encoding may be expressed by the formula:

$$E^f = (E^i \| E^g) W_3 + b_3$$

$$x'_{attn} = LayerNorm\left(E_{\mathcal{U}} + \text{Attention}\left(E_{\mathcal{U}}^{G^{st}}, E^f, E_{\mathcal{U}}\right)\right)$$

$$E_u^f = FFN(x'_{attn}) + x'_{attn}$$

In the formula: $\|$ represents the concatenation operation, $W_3 \in \mathbb{R}^{2d \times d}$, $b_3 \in \mathbb{R}^d$, are all learnable parameters, and $E_u^f$ is the user fusion feature representation finally obtained.

Therefore, the multimodal knowledge fusion module may finally output the point-of-interest fusion feature representation $E_{s(u)}^f$ and the user fusion feature representation $E_u^f$. Both of the feature representations fuse the multimodal information, and points of interest can be predicted by inputting the two representations into the decoding module. In the decoder module, a recurrent neural network RNN and a multi-layer perceptron MLP are included, which are used in cascade. In an embodiment of the disclosure, the recurrent neural network adopts a long short-term memory network LSTM, and the corresponding point-of-interest prediction process may be expressed by the formula:

$$H_{t_i} = LSTM\left(E_{S(u)}^f \| E_{\mathcal{U}}^f, H_{t_{i-1}}\right)$$

In the formula: $\|$ represents the concatenation operation, $H_{t_i}$ and $H_{t_{i-1}}$ respectively represent the hidden layer state information at a time $ti$ and a time $t_{i-1}$ in the LSTM network, $i \in [1, m]$, m is the total time steps of the LSTM network. The hidden layer state information $H_{t_m}$ lastly output by LSTM is input into the multi-layer perceptron MLP to obtain the final point-of-interest prediction result $\hat{y}^{poi}$:

$$\hat{y}^{poi} = MLP(H_{t_m})$$

It should be noted that the Step S3 describes the prediction process of the point-of-interest recommendation model in actual application and reasoning scenarios, but it should be understood that the point-of-interest recommendation model needs to be trained and optimized in advance through the total loss function before being used for actual reasoning. In an embodiment of the disclosure, the total loss function is obtained by weighting the point-of-interest prediction loss and the static graph loss of all historical time slices.

In the embodiment, the point-of-interest prediction loss $L^{poi}$ is the cross entropy loss $L^{poi}$ between the predicted value $\hat{y}^{poi}$ and the label value $y^{poi}$ output by the point-of-interest recommendation model, and the calculation formula is:

$$\mathcal{L}^{poi} = -\sum \left(\log \sigma\left(y_k^{poi}\right) + \sum_{j=1, j \neq k}^{|G|} \log\left(1 - \sigma(\hat{y}_k^{poi})\right)\right)$$

In the formula, $|G|$ is the number of dynamic relationship knowledge graphs in the dynamic temporal knowledge graph G, which represents the total number of historical time slices; $\hat{y}^{poi}$ and $y^{poi}$ with subscript k represent the predicted value and the label value corresponding to the k-th point of interest.

When calculating the static graph loss, it is necessary to limit the deviation angle of the same entity embedding in the dynamic temporal knowledge graph and the static group knowledge graph respectively so that the angle does not exceed a threshold related to the timestamp. For any x-th historical time slice, the deviation angle is specifically defined as follows:

$$\theta_x = \min(\gamma x, 90°)$$

In the formula, $\gamma$ represents the rate of increase of the deviation angle, which is a hyperparameter. The subscript $x \in [1, 2, \ldots, |G|]$ represents the x-th historical time slice in the dynamic temporal knowledge graph, and the maximum deviation angle between two entity embeddings is 90°. Therefore, the calculation formula for the static graph loss corresponding to the x-th historical time slice is:

$$\mathcal{L}_x^{st} = \sum_{i=1}^{|V|} \max\left(\cos \theta_x - \cos\left(H_i^{G^{st}}, H_i^{G_x}\right), 0\right)$$

In the formula, $|V|$ represents the number of entities in the entity set V formed by all users and all points of interest in the static group knowledge graph, $$H_i^{G^{st}}$$

and $$H_i^{G_x}$$

respectively represent the corresponding embedding feature representations of the i-th entity in V in the fused dynamic temporal knowledge graph and the fused static group knowledge graph.

The final total loss function for training the point-of-interest recommendation model is expressed as:

$$\mathcal{L} = \mathcal{L}^{poi} + \lambda \mathcal{L}^{st} = \mathcal{L}^{poi} + \lambda \sum_{x=1}^{|G|} \mathcal{L}_x^{st}$$

In the formula, $\lambda \in [0, 0.1]$ is a hyperparameter used to balance the point-of-interest prediction loss $L^{poi}$ and the sum $L^{st}$ of the static graph losses of all historical time slices.

The specific model training process belongs to the existing technology. The learnable parameters may be continuously optimized by combining the total loss function and the optimizer. The optimized point-of-interest recommendation model may be used for actual reasoning.

It should be noted that Step S3 is executed by a computer device on the server side, and the specific execution process is as follows. First, the computer device reads several types of data needed to be input into the point-of-interest recommendation model from the local storage into the memory, and then calls the point-of-interest recommendation model pre-stored in the local computer to obtain the prediction result, that is, the points of interest that the target user may visit at the next moment. The prediction results obtained above may be displayed on the local display of the computer according to actual needs, the prediction results may also be uploaded to a cloud platform or data center via the Internet for visual display, or may be pushed to mobile devices such as mobile phones and tablets held by users for visual display.

In addition, in another embodiment of the disclosure, if the computer device on the server side pushes the prediction results (the points of interest that the target user may visit at the next moment) to the mobile device held by the user for visual display, since there may be multiple points of interest in the prediction results, the information may be further processed to improve the display effect. The information processing method on the mobile device is as follows. After the mobile device receives the prediction result transmitted by the computer device on the server side through the network, the mobile device calls its own GPS module to obtain the current positioning information of the mobile device, and then calculates the distance l between each point of interest in the prediction result and the current positioning position of the mobile device. Then, according to the maximum distance threshold L of the interest point set by the user, the points of interest whose distance l do not exceed the distance threshold L are displayed in the GUI interface of the social platform application running on the mobile device, while the remaining points of interest whose distance l from the current positioning position of the mobile device exceeds the distance threshold L are not displayed in the GUI interface. In the embodiment, the maximum distance threshold L of the point of interest may be input by the user in the GUI interface, or a default value in the social platform application may be used.

It should be noted that the method steps shown in S1 to S3 above may essentially be implemented in the form of a computer program. The computer program runs on the computer device on the server side, and the processor of the computer is responsible for executing the functions involved in the program. The computer program is a set of background programs matching the social platform application running on the mobile device of the user side.

Figure 5:
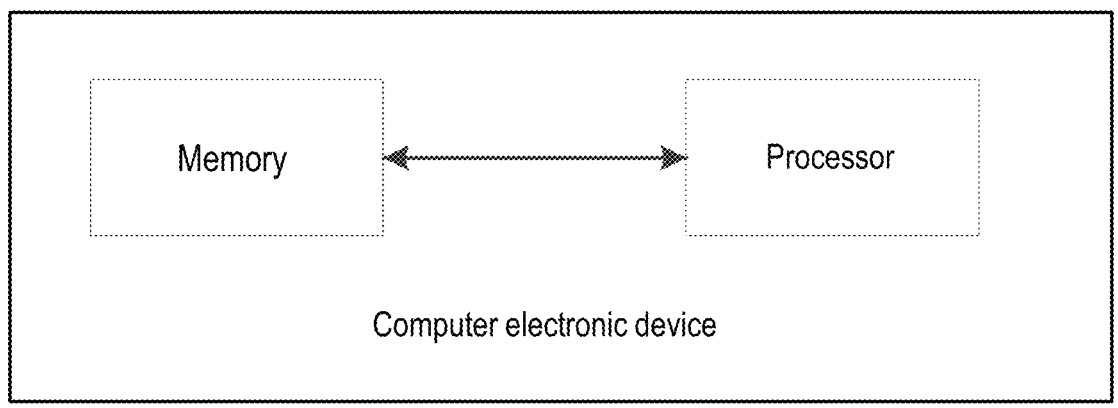
FIG. 5 is a schematic diagram of the structure of a computer electronic device according to an embodiment of the disclosure.

Therefore, based on the same inventive concept, as shown in FIG. 5, the disclosure further provides a computer electronic device corresponding to the point-of-interest recommendation method based on the temporal knowledge graph provided in the above embodiments, which includes a memory and a processor.

The memory is used to store a computer program.

The processor is used to implement the point-of-interest recommendation method based on the temporal knowledge graph as described above when executing the computer program.

The memory may be a random access memory (RAM) or a non-volatile memory (NVM). The processor may be a general-purpose processor, such as a central processing unit (CPU). The computer electronic device disposed with the memory and processor may be in the form of a PC, a separate server, or a server cluster, for example.

The disclosure will further demonstrate the detailed implementation process and technical effects of the point-of-interest recommendation method based on the temporal knowledge graph shown in the Steps S1 to S3 on a specific data set through a specific embodiment, so as to facilitate understanding the essence of the disclosure.

EXAMPLE

The steps of this embodiment are the same as the point-of-interest recommendation method based on the temporal knowledge graph shown in Steps S1 to S3, so details will not be repeated here. The specific data set, some specific parameter settings, and implementation results of this embodiment will be mainly demonstrated. For the convenience of description, the method shown in Steps S1 to S3 is referred to as the method of the disclosure, and the point-of-interest recommendation model used therein is denoted as MINet.

The original data used in this embodiment are three widely used real-scene data sets: Foursquare, Gowalla, and Yelp. In the Gowalla dataset, there are 3,300,986 check-ins by 52,979 users at a total of 121,851 locations; in the Foursquare dataset, there are 9,447,873 check-ins by 46,065 users at a total of 69,005 locations; in the Yelp dataset, there are 632,476 check-ins by 9,627 users at a total of 8,696 locations. Since the Foursquare and Gowalla datasets do not contain user review information, this embodiment also builds a default version model based on MINet without inputting the user review sentiment embedding sequence, which is denoted as MINet-Revised, as one of the control methods in subsequent experiments.

In this embodiment, some parameters of MINet are selected as follows: the length m of the historical behavior trajectory substring is 20, and the word vector dimension d is 64; the number of HGT stacking layers l is 1, and the number of attention heads h is 1; the weighted hyperparameter Δ of the static graph loss is 0.01, and the hyperparameter γ of the rate of increase of the deviation angle is 1°. The iteration termination condition set during the training of the point-of-interest recommendation model is that the iteration rounds reach 50 or the total loss function value converges.

In addition, the experiment of this embodiment further compares the method of the disclosure with several conventional prediction methods. The conventional prediction methods used as comparison are: (1) FPMC: a conventional Markov chain model based on user personalized behavior; (2) RNN: a recurrent neural network that makes predictions based on historical trajectory sequences; (3) DeepMove: a recurrent neural network based on fusion of attention information and trajectory sequences; (4) STAN: a two-layer attention network based on spatial-temporal attention; (5) TiSASRec: a sequence location and time interval based attention network; (6) Flashback: a recurrent neural network based on the contextual information of the past hidden layer and the current hidden layer; (7) GETNext: a Transformer model that predicts user behavior based on global transition probabilities; (8) a model for learning POI transfer relations based on spatial-temporal knowledge graph; (9) MARAN: a model based on local center trajectory aggregation and user behavior patterns. The embodiment uses the average precision rate (Acc @K) and the mean reciprocal rank (MRR) as evaluation indicators of the prediction model. Acc @K calculates the ratio of true positive samples among the top K predicted samples. In the experiment, the setting is K={5, 10}. MRR may reflect the overall performance of recommendations and places more emphasis on predicting rankings.

The final experimental results are shown in Table 1. It may be seen that MINet in the method of the disclosure achieves better results on the Yelp dataset than the control model. Specifically, on the Yelp dataset, MINet achieves improvements of 9.86%, 6.48%, and 7.21% in Acc@5, Acc@10, and MRR indicators respectively compared with the best performing control model MARAN. In addition, the default version of MINet-Revised also achieves better results in Gowalla compared with the control model, with improvements of 2.56%, 0.90%, and 3.45% respectively. In the Foursquare dataset, it is slightly inferior to the best-performing control model MARAN, with an average gap of 1.40%. It is worth mentioning that on the Yelp dataset, MINet improves by 47.17%, 45.24%, and 33.53% in various indicators compared with the default version. The comparison shows the effectiveness of the method of the disclosure.

TABLE 1

Comparison of experimental results of the method of the disclosure and the control method

| Comparison | Gowalla | | | Foursquare | | | Yelp | | |
|---|---|---|---|---|---|---|---|---|---|
| method | Acc@5 | Acc@10 | MRR | Acc@5 | Acc@10 | MRR | Acc@5 | Acc@10 | MRR |
| FPMC | 0.1668 | 0.2411 | 0.1126 | 0.2384 | 0.3348 | 0.1578 | 0.0016 | 0.0022 | 0.0023 |
| RNN | 0.2140 | 0.2717 | 0.1507 | 0.4334 | 0.5237 | 0.2984 | 0.0124 | 0.0255 | 0.0134 |
| DeepMove | 0.1304 | 0.1594 | 0.0982 | 0.4319 | 0.4742 | 0.3270 | 0.0094 | 0.0218 | 0.0103 |
| STAN | 0.2096 | 0.2763 | 0.1523 | 0.4515 | 0.5310 | 0.3420 | 0.0135 | 0.0259 | 0.0142 |
| TiSASRec | 0.2162 | 0.2631 | 0.1549 | 0.4643 | 0.5479 | 0.3471 | 0.0079 | 0.0156 | 0.0087 |
| Flashback | 0.2754 | 0.3479 | 0.1925 | 0.5399 | 0.6236 | 0.3805 | 0.0151 | 0.0272 | 0.0154 |
| GETNext | 0.3255 | 0.4195 | 0.2240 | 0.5735 | 0.6510 | 0.4018 | 0.0150 | 0.0261 | 0.0150 |
| Graph-Flashback | 0.3425 | 0.4256 | 0.2422 | 0.5757 | 0.6514 | 0.4136 | 0.0180 | 0.0312 | 0.0184 |
| MARAN | 0.3852 | 0.4755 | 0.2736 | 0.6125 | 0.6983 | 0.4414 | 0.0213 | 0.0401 | 0.0208 |
| MINet | — | — | — | — | — | — | 0.0234 | 0.0427 | 0.0223 |
| MINet-Revised | 0.3951 | 0.4798 | 0.2831 | 0.6057 | 0.6850 | 0.4360 | 0.0159 | 0.0294 | 0.0167 |
| Improved rate (%) | 2.56% | 0.90% | 3.45% | −1.11% | −1.90% | −1.21% | 9.86% | 6.48% | 7.21% |

The embodiments are only a preferred solution of the disclosure, but the embodiments are not intended to limit the disclosure. Persons skilled in the relevant technical field may also make various changes and modifications without departing from the spirit and scope of the disclosure. Therefore, any technical solutions obtained by equivalent replacement or equivalent substitutions fall within the protection scope of the disclosure.

What is claimed is:

1. A point-of-interest recommendation method based on a temporal knowledge graph, comprising:

S1. constructing a dynamic temporal knowledge graph and a static group knowledge graph based on complete historical behavior trajectories of all users; wherein the dynamic temporal knowledge graph is a graph set formed by dynamic relationship knowledge graphs of different historical time slices, each of the dynamic relationship knowledge graphs records a dynamic relationship between all of the users and points of interest in the historical time slices, the dynamic relationship comprises a visit relationship for recording a visit behavior of the user to the point of interest, and a follow-up relationship for recording a neighboring visit behavior of the user to different points of interest; wherein the static group knowledge graph records a static relationship between all of the users and the points of interest in all of the historical time slices, the static relationship comprises a social relationship for recording a friend relationship between the users, a location relationship for recording a spatial area where the point of interest is located, a neighboring relationship for recording whether the different points of interest are neighboring points, a category relationship for recording a point-of-interest category to which the point of interest belongs, and a group relationship for recording a user group grouped according to a visited point of interest and a visited spatial area;

S2. obtaining a historical behavior trajectory substring of a target user before a time to be predicted, extracting sequentially a user review text of each of the points of interest visited by the user therefrom, performing word embedding on the user review text using an aspect-level sentiment analysis module built based on a pre-trained model, and concatenating sentiment embeddings of all of the user review texts to obtain a user review sentiment embedding sequence;

S3. inputting the historical behavior trajectory substring, the dynamic temporal knowledge graph, the static group knowledge graph, and the user review sentiment embedding sequence into a point-of-interest recommendation model, wherein an embedding module first performs word embedding on the input data, then a multimodal knowledge fusion module fuses the dynamic temporal knowledge graph and the static group knowledge graph based on a heterogeneous mutual attention mechanism and fuses the point of interest, the user, and other multimodal information to obtain a point-of-interest fusion feature representation and a user fusion feature representation, and finally a decoding module concatenates the point-of-interest fusion feature representation and the user fusion feature representation and then inputs into a cascaded recurrent neural network and a multi-layer perceptron to predict a point of interest likely to be visited by the target user at a next moment, wherein a processing flow in the multimodal knowledge fusion module is as follows:

S31. inputting respectively the dynamic temporal knowledge graph and the static group knowledge graph into a heterogeneous graph transformer network for information fusion, and obtaining the dynamic temporal knowledge graph and the static group knowledge graph fused;

S32. arranging all of the points of interest in the historical behavior trajectory substring according to an order of user visits, extracting sequentially a hidden layer vector corresponding to each of the points of interest from the dynamic temporal knowledge graph fused to form a user behavior trajectory embedding with global time slice information, extracting sequentially a hidden layer vector corresponding to each of the points of interest from the static group knowledge graph fused to form a user behavior trajectory embedding with global static information; extracting a point-of-interest level group feature and an area level group feature from the static group knowledge graph fused;

S33. using the user review sentiment embedding sequence as a query, fusing the user behavior trajectory embedding with the global time slice information and an original user behavior trajectory embedding through an attention mechanism to obtain the user behavior trajectory embedding fused; using the user behavior trajectory embedding fused as a value, the user behavior trajectory embedding with the global static information as the query, and the point-of-interest level group feature as a key, and inputting into an Encoder module of a Transformer model for fusion encoding to obtain a point-of-interest fusion feature representation; and S34. concatenating and fusing the point-of-interest level group feature and the area level group feature, using the obtained group feature fused as a key, user embedding feature representations of all of the users in the static group knowledge graph fused as a query, the user embedding feature representations of all of the users in an original static group knowledge graph as a value, and inputting into the Encoder module of the Transformer model for fusion encoding to obtain a user fusion feature representation.

2. The point-of-interest recommendation method based on the temporal knowledge graph according to claim 1, wherein
in the dynamic temporal knowledge graph, the visit relationship is recorded by a four-tuple formed by the user, a visit relationship identifier, a visit point of interest, and a visit time, and the follow-up relationship is recorded by a four-tuple formed by a previously visited location, a follow-up relationship identifier, a later visited location, and the visit time,
in the static group knowledge graph, the social relationship is recorded by a triple formed by the user, a social relationship identifier, and another user, the location relationship is recorded by a triple formed by the point of interest, a location relationship identifier, and a Geohash-5 spatial area located, the neighboring relationship is recorded by a triple formed by a first point of interest, a neighboring relationship identifier, and a second point of interest, the category relationship is recorded by a triple formed by the point of interest, a category relationship identifier, and a point-of-interest category, the group relationship is recorded by a triple formed by the user, a group relationship identifier, and the user group, wherein the user group is divided into a point-of-interest level group based on clustering of the visited points of interest and an area level group based on clustering of visited Geohash-5 spatial areas.

3. The point-of-interest recommendation method based on the temporal knowledge graph according to claim 1, wherein the aspect-level sentiment analysis module is obtained by fine-tuning a pre-trained DistilBERT model cascaded with a multi-class classifier; in the aspect-level sentiment analysis module, an embedding representation is first generated for the user review text by the DistilBERT model, then, the embedding representation is input into the multi-class classifier to obtain a review dimension corresponding to the user review text and a positive or negative score on each of the review dimensions, and the positive or negative scores on all of the review dimensions are concatenated and output as the sentiment embedding corresponding to the user review text.

4. The point-of-interest recommendation method based on the temporal knowledge graph according to claim 3, wherein the review dimension comprises three dimensions: a product, a price, and a service.

5. The point-of-interest recommendation method based on the temporal knowledge graph according to claim 1, wherein the point-of-interest recommendation model needs to be trained in advance, and a total loss function used in the training is obtained by weighting a point-of-interest prediction loss and a static graph loss of all of the historical time slices; the point-of-interest prediction loss is a cross entropy loss between a predicted value and a label value output by the point-of-interest recommendation model, the static graph loss of any x-th historical time slice is calculated as $$\mathcal{L}_x^{st} = \sum_{i=1}^{|V|} \max(\cos(\min(\gamma x, 90°)) - \cos(H_i^{G^{st}}, H_i^{G_x}), 0),$$

wherein a hyperparameter $\gamma$ represents a rate of increase of a deviation angle, $|V|$ represents the number of entities in an entity set V formed by all of the users and all of the points of interest in the static group knowledge graph, and $$H_i^{G^{st}}$$

and $$H_i^{G_x}$$

respectively represent corresponding embedding feature representations of an i-th entity in the entity set V in the dynamic temporal knowledge graph fused and the static group knowledge graph fused.

6. The point-of-interest recommendation method based on the temporal knowledge graph according to claim 1, wherein the recurrent neural network in the decoding module adopts a long short-term memory network.

7. A computer program product, comprising a computer program/command, wherein in response to the computer program/command being executed by a processor, the point-of-interest recommendation method based on the temporal knowledge graph according to claim 1 is implemented.

8. A computer-readable storage medium, wherein a computer program is stored on the storage medium, and in response to the computer program being executed by a processor, the point-of-interest recommendation method based on the temporal knowledge graph according to claim 1 is implemented.

9. A computer electronic device, comprising a memory and a processor, wherein
the memory is configured to store a computer program,
the processor is configured to implement the computer program, and in response to the computer program being executed, the point-of-interest recommendation method based on the temporal knowledge graph according to claim 1 is implemented.

* * * * *